(12) United States Patent
Henry (10) Patent No.: US 8,498,730 B2
(45) Date of Patent: Jul. 30, 2013

(54) SYSTEM AND METHOD FOR CREATING CUSTOMIZED PRODUCTS

(75) Inventor: James (Bobby) Henry, Donelson, TN (US)

(73) Assignee: Jostens, Inc., Minneapolis, MN (US)

( * ) Notice: Subject to any disclaimer, the term of this patent is extended or adjusted under 35 U.S.C. 154(b) by 212 days.

(21) Appl. No.: 13/052,944

(22) Filed: Mar. 21, 2011

(65) Prior Publication Data

US 2011/0231004 A1 Sep. 22, 2011

Related U.S. Application Data

(60) Provisional application No. 61/315,870, filed on Mar. 19, 2010.

(51) Int. Cl.
| | |
|---|---|
| *A45F 5/12* | (2006.01) |
| *B42C 11/00* | (2006.01) |
| *B42D 15/00* | (2006.01) |
| *B65D 69/00* | (2006.01) |
| *G06F 19/00* | (2011.01) |

(52) U.S. Cl.
USPC ............. 700/115; 206/232; 206/424; 283/64; 283/70; 283/81; 412/4

(58) Field of Classification Search
USPC ............. 700/95, 96, 115, 124; 206/232, 424, 206/459.1, 459.5; 281/15.1, 21.1, 29, 42; 283/67, 70, 72, 81, 63.1, 64; 340/572.7; 412/1, 412/4
See application file for complete search history.

(56) References Cited

U.S. PATENT DOCUMENTS

| | | | |
|---|---|---|---|
| 1,673,839 | A | 6/1928 | McWane |
| 2,351,469 | A | 6/1944 | Allen |
| 2,964,169 | A | 12/1960 | Brachman |
| 3,217,868 | A | 11/1965 | Champlin et al. |
| 3,756,502 | A | 9/1973 | Swanson et al. |
| 4,329,191 | A | 5/1982 | Barber |
| 4,627,219 | A | 12/1986 | Omori |
| 4,679,823 | A | 7/1987 | Nagy |
| 5,054,816 | A | 10/1991 | Rosengarten |
| 5,207,326 | A | 5/1993 | Benach |
| 5,397,156 | A | 3/1995 | Schach et al. |
| 5,414,974 | A | 5/1995 | Van de Ven et al. |
| 5,465,213 | A * | 11/1995 | Ross ............................ 700/117 |

(Continued)

OTHER PUBLICATIONS

Declaration of Dale Hunt Nichols, Sr., dated Nov. 17, 2008, submitted in U.S. Appl. No. 11/761,917 (18 pp.).

(Continued)

*Primary Examiner* — Mohammad Ali
*Assistant Examiner* — Jennifer L Norton
(74) *Attorney, Agent, or Firm* — Winthrop & Weinstine, P.A.

(57) ABSTRACT

The present invention relates to a system and method for creating customized products using a product identification device. In some embodiments, the process involves receiving an aggregate order for yearbooks, creating a master list associated with the aggregate order and including single orders, associating at least one number with each single order, manufacturing a first portion of a yearbook for each single order with a first identifier associated with that portion and also being associated with the at least one number, manufacturing a second portion of the yearbook for the single order with a second identifier associated with that portion and also being associated with the at least one number, and combining the first portion with the second portion.

9 Claims, 5 Drawing Sheets

U.S. PATENT DOCUMENTS

| | | | |
|---|---|---|---|
| 5,657,872 A | | 8/1997 | Leftwich et al. |
| 5,729,674 A | | 3/1998 | Rosenwarne et al. |
| 5,799,316 A | * | 8/1998 | Audren ............... 360/2 |
| 5,881,884 A | | 3/1999 | Podosek |
| 5,950,914 A | | 9/1999 | Dunton et al. |
| 5,958,536 A | | 9/1999 | Gelsinger et al. |
| 5,963,134 A | | 10/1999 | Bowers et al. |
| 6,148,245 A | * | 11/2000 | Lynch et al. ............ 700/115 |
| 6,155,602 A | | 12/2000 | Mylander et al. |
| 6,230,878 B1 | | 5/2001 | Lehr |
| 6,237,908 B1 | * | 5/2001 | Chang et al. ............ 270/52.15 |
| 6,308,988 B1 | | 10/2001 | Mylander et al. |
| 6,922,601 B1 | * | 7/2005 | Cosci et al. ............ 700/108 |
| 6,932,265 B2 | | 8/2005 | Sax et al. |
| 6,976,588 B2 | | 12/2005 | Wischusen et al. |
| 7,080,736 B2 | | 7/2006 | Jackson et al. |
| 7,165,377 B2 | | 1/2007 | Gillet et al. |
| 7,183,918 B1 | | 2/2007 | Nichols, Sr. |
| 7,328,552 B2 | | 2/2008 | Lackey et al. |
| 7,411,499 B2 | | 8/2008 | Nichols, Sr. |
| 7,448,650 B2 | * | 11/2008 | Hengsbach ............... 281/29 |
| 7,551,060 B1 | | 6/2009 | Seevers |
| 7,557,717 B2 | | 7/2009 | Nichols, Sr. |
| 7,605,703 B2 | | 10/2009 | Nichols, Sr. |
| 7,614,837 B2 | * | 11/2009 | Anderson et al. ............ 412/1 |
| 7,680,253 B2 | | 3/2010 | Kessler et al. |
| 7,680,554 B2 | * | 3/2010 | Erickson et al. ............ 700/115 |
| 8,072,330 B1 | | 12/2011 | Nichols, Sr. |
| 8,334,774 B2 | | 12/2012 | Nichols, Sr. |
| 2003/0102367 A1 | * | 6/2003 | Monette et al. ............ 235/376 |
| 2003/0130784 A1 | * | 7/2003 | Peltier ............ 701/104 |
| 2003/0130926 A1 | | 7/2003 | Moore et al. |
| 2003/0168514 A1 | | 9/2003 | Rancien et al. |
| 2005/0149216 A1 | * | 7/2005 | Popplewell ............ 700/96 |
| 2005/0263434 A1 | | 12/2005 | Tibbels |
| 2005/0280503 A1 | * | 12/2005 | Lee et al. ............ 340/10.1 |
| 2006/0210379 A1 | * | 9/2006 | Kearns ............ 412/4 |
| 2007/0053004 A1 | | 3/2007 | Calaway |
| 2007/0103725 A1 | * | 5/2007 | Kawahara et al. ............ 358/1.15 |
| 2007/0204086 A1 | * | 8/2007 | Jaroszewski et al. ............ 710/262 |
| 2008/0030342 A1 | * | 2/2008 | Elizondo et al. ............ 340/572.7 |
| 2008/0043254 A1 | | 2/2008 | Crum |
| 2008/0068666 A1 | | 3/2008 | Niblett et al. |
| 2008/0265027 A1 | * | 10/2008 | Silverbrook et al. ............ 235/385 |
| 2008/0267510 A1 | | 10/2008 | Paul et al. |
| 2009/0121880 A1 | | 5/2009 | Joyce, Jr. et al. |
| 2010/0036694 A1 | * | 2/2010 | Schroeder et al. ............ 705/7 |
| 2010/0047039 A1 | * | 2/2010 | Anderson et al. ............ 412/9 |
| 2010/0307944 A1 | | 12/2010 | Johnson |
| 2010/0316316 A1 | * | 12/2010 | Kamel ............ 384/448 |

OTHER PUBLICATIONS

Dolloff, J. Holly, "Book maker employing RFID to manage inventory, foil theft", Nashville Business Journal, Mar. 2005 (1 pp.).

"New Book Binding Process is Patented", Printing Impressions, Apr. 2005 (p. 38).

Letter from Professor Werner Robsamen dated Apr. 25, 2005 (1 pp.).

"Smart Guard™ Embeds RFID Tags Into Covers of Hardcover Books", RFID Product News, vol. 2, Issue 6, Nov./Dec. 2005 (1 pp.).

D'Agostino, Debra, "RFID: The Book on Item Level Tagging", CIO Insight, Nov. 1, 2006 (1 pp.). Retrieved from the Internet on Mar. 7, 2013 <http://www.cioinsight.com/c/a/Technology/RFID-The-Book-on-Itemlevel-Tagging/>.

Dehainaut, Dennis, "RFID: The Future in Book Technology", The Binding Edge, Spring 2007 (pp. 5-7).

* cited by examiner

SYSTEM AND METHOD FOR CREATING CUSTOMIZED PRODUCTS

CROSS REFERENCE TO RELATED APPLICATIONS

This application claims priority to U.S. Provisional Patent Application No. 61/315,870, filed on Mar. 19, 2010, the entire contents of which are incorporated herein by reference.

FIELD OF THE INVENTION

This invention relates generally to a system and method for creating customized products, and more specifically to a system and method for creating customized products using a product identification device.

BACKGROUND OF THE INVENTION

Consumer products are being offered with common and customized portions. A challenge with manufacturing such products is associating the correct customized portions with corresponding common portions. For example, in yearbooks, a large portion of the yearbook is common to a school with students or parents being offered the opportunity to incorporate customized pages, a customized cover, and other customized elements to create a customized yearbook. In manufacturing such customized yearbook, the correct customized elements should be associated with the correct common yearbook.

BRIEF SUMMARY OF THE INVENTION

The present invention relates to a system and method for creating customized products using a product identification device. In some embodiments, the process involves receiving an aggregate order for yearbooks, creating a master list associated with the aggregate order and including single orders, associating at least one number with each single order, manufacturing a first portion of a yearbook for each single order with a first identifier associated with that portion and also being associated with the at least one number, manufacturing a second portion of the yearbook for the single order with a second identifier associated with that portion and also being associated with the at least one number, and combining the first portion with the second portion. It is to be appreciated that, in some embodiments, one or more of these steps may not be included and/or other steps not listed may be included.

While multiple embodiments are disclosed, still other embodiments of the present teachings will become apparent to those skilled in the art from the following detailed description, which shows and described illustrative embodiments. As will be realized, the teachings are capable of modifications in various obvious aspects, all without departing from the spirit and scope of the present teachings. Accordingly, the drawings and detailed description are to be regarded as illustrative in nature and not restrictive.

DETAILED DESCRIPTION OF THE INVENTION

The present invention relates to a system and method for creating customized products using a product identification device. The system and method enable tracking of the customized product such that it may be appropriately manufactured as well as to ensure integrity and quality of the manufacturing process. More specifically, in one embodiment, the system and method enable tracking of a book that is customized to a particular individual during all processes require to make that book.

The system and method may be used for manufacturing a variety of consumer products including, for example, yearbooks, memory books, photo books, commercial books, magazines, and calendars. The system and method are generally suited for manufacture of any item comprising multiple portions that are formed separately at concurrent or separate parts of the method. For example, in one embodiment, the system and method may be used for manufacture of an item formed in two parts. For example, in one embodiment, the system and method may be used for manufacture of an item that includes a first portion and a second portion wherein the first portion and the second portion are coupled or adjoined. The system and method facilitate tracking of each portion through the manufacturing process and verification of the portions prior to, and after, coupling. It is to be appreciated that the system and method may be used to manufacture an item comprising any number of portions and that two portions are described herein only for purposes of illustration.

Accordingly, the system and method may be used for manufacturing yearbooks, memory books, or other books. Yearbooks generally are hard cover, have 50 to several hundred pages (page range may vary), include endsheets and tip-ins, and may be produced in color or in black and white. Memory books generally are often soft cover, have 8-64 pages (page range may vary), and may be produced in color or in black and white. Further, the present invention may be applied to any customized product—including books or other output. Thus, while the present invention is generally described in terms of yearbooks, the invention is equally suited for manufacture of other customized products. The invention may further be used for aggregating a plurality of products.

Yearbooks are commonly used to document a particular year at a school. Increasingly, students and parents are given the opportunity to incorporate personalized elements into a yearbook. These elements may include custom pages, custom endsheets, a custom cover, or other elements. In some schools, a DVD or other add-on may be included with a yearbook.

Figure 1:
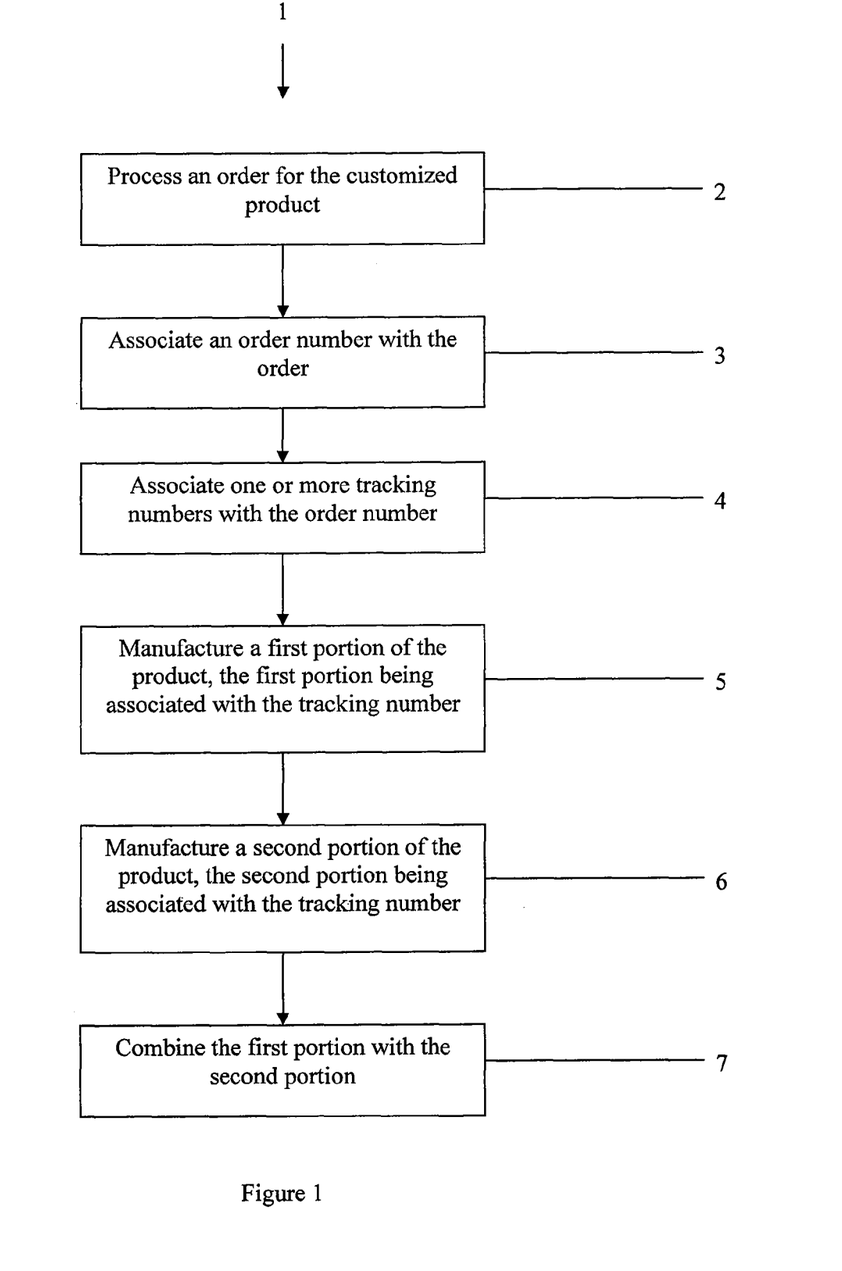
FIG. 1 illustrates a process for creating a customized product including a first portion and a second portion, in accordance with one embodiment of the present invention.

FIG. 1 illustrates a process 1 for creating a customized product including a first portion and a second portion. An order for the customized product is processed [block 2]. Such processing may comprise receiving an order via computer, receiving a paper order, crafting an order, or otherwise developing information regarding specifics for the product. An order number (also referred to herein generically as a number)

is associated with the order [block 3]. One or more tracking numbers (also referred to herein as identifiers) are associated with the order number [block 4]. A first portion of the product is manufactured with the tracking number associated therewith [block 5]. A second portion of the product is also manufactured with the tracking number associated therewith [block 6]. It is to be appreciated that the tracking number associated with the first portion and the tracking number associated with the second portion may be the same tracking number or may be different tracking numbers so long as the tracking number is associated with the order number. The first portion and the second portion are then combined [block 7]. In some embodiments, such combination may result in the final product as ordered. It is to be appreciated that by using RFID, bar code, and related technology for correlating the tracking number(s) with the first portion and the second portion, tracking of production of the first portion and the second portion may be automated using machine readers such that human interaction is substantially eliminated.

One application for the system and method involves manufacture of customized books such as yearbooks or memory books. Manufacture of a yearbook includes manufacture of a common portion of the yearbook, manufacture and incorporation of a customized portion of the yearbook, and manufacture and attachment of a cover (customized or common). Using the system and method, each of the common portion, the customized portion, and the cover may be tracked and coordinated. Further, the time each portion entered and exited a particular machine in the manufacturing process may be tracked such that any failure of machinery can be determined.

Figure 2:
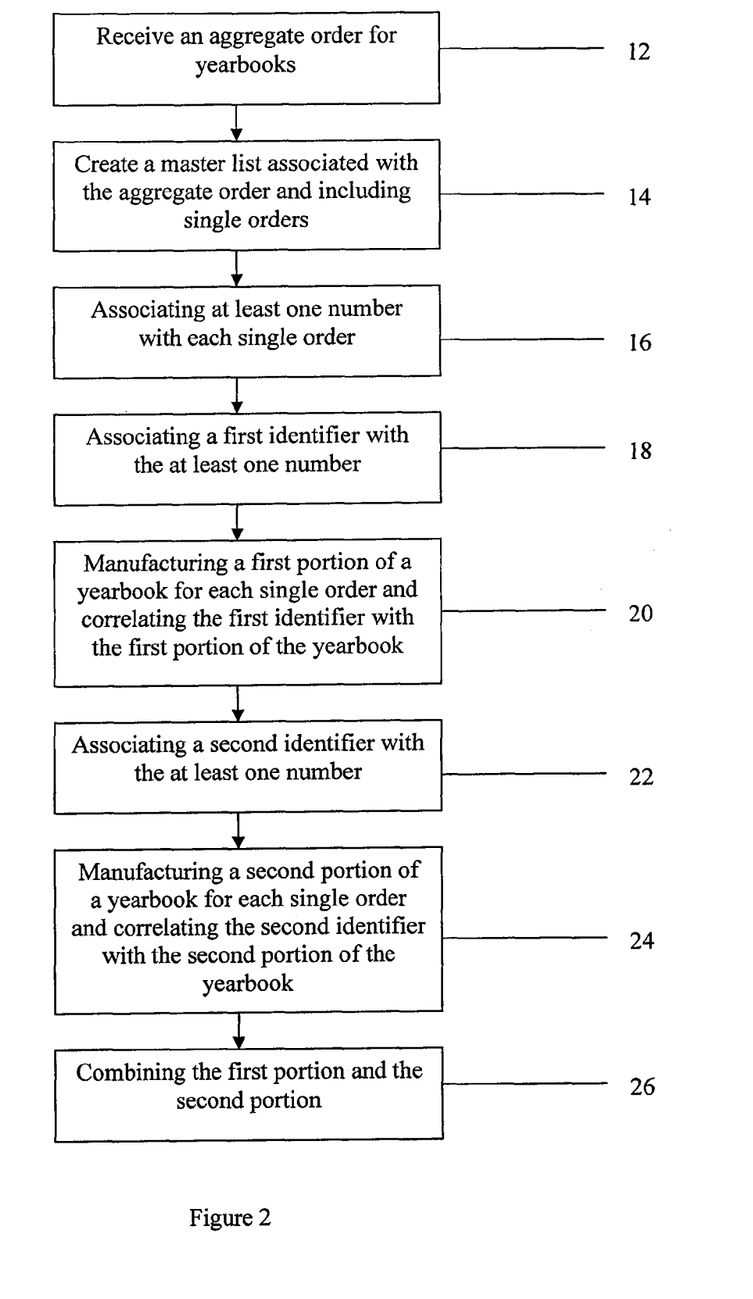
FIG. 2 illustrates a process for creating customized products, in accordance with one embodiment of the present invention.

FIG. 2 illustrates a process 10 for creating customized products in accordance with one embodiment. As shown, the process involves receiving an aggregate order for yearbooks [block 12], creating a master list associated with the aggregate order and including single orders [block 14], associating at least one number with each single order [block 16], associating a first identifier with the at least one number [block 18], manufacturing a first portion of a yearbook for each single order and correlating the first identifier with the first portion of the yearbook [block 20], associating a second identifier with the at least one number [block 22], manufacturing a second portion of the yearbook for the single order and correlating the second identifier with the second portion of the yearbook [block 24], and combining the first portion with the second portion [block 26]. In various embodiments, one or more of the listed steps of FIG. 1 may not be performed. Further, in some embodiments one or more steps not listed in FIG. 1 may be performed. Again, while manufacture of a yearbook is described, the process may alternatively be applied to any product having a first portion and a second portion wherein the first portion and the second portion are combined to form the final product.

As used herein, an order may refer to a single order (for example for a single student) or an aggregate order (for example for an entire school). For the purposes of illustration, a single student order will be referred to as a single order and a school order will be referred to as an aggregate order. Generally, an aggregate order may comprise a plurality of single orders. The plurality of single orders may be placed on a master list such that the orders may be more easily tracked. In some cases, a student may order only a yearbook (customized or common to the school). In other cases, the student may order a plurality of items such as a yearbook, graduation announcements, cap and gown, etc. While FIG. 2 specifically illustrates receiving an aggregate order for yearbooks [block 12], creating a master list associated with the aggregate order and including single orders [block 14], and associating at least one number with each single order [block 16], in some embodiments other means for assimilating and tracking orders may be used.

Figure 3:
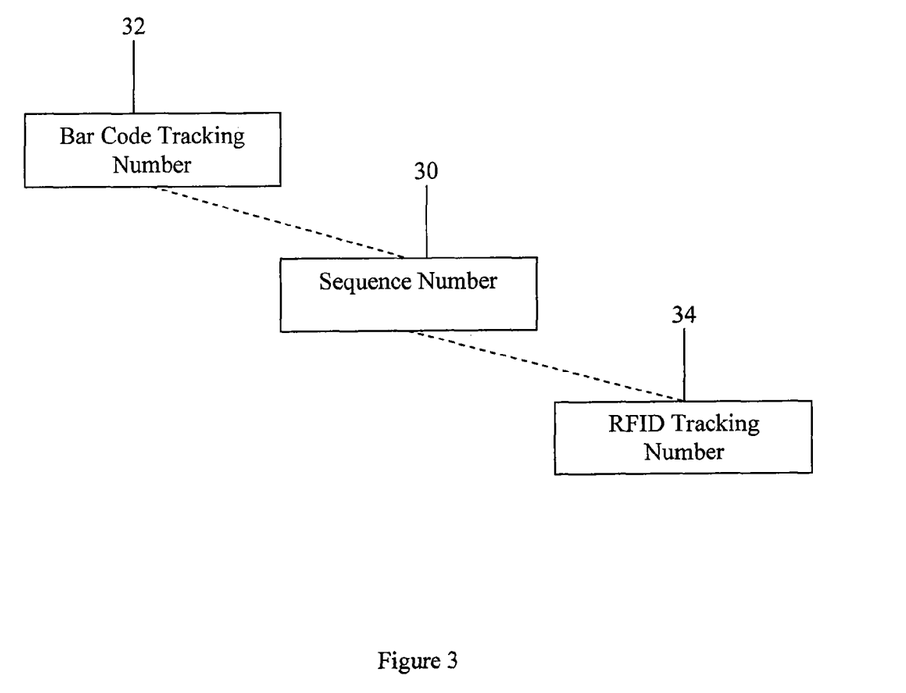
FIG. 3 illustrates numbers that may be associated with a single order, in accordance with one embodiment of the present invention.

When an order (single or aggregate) is received, one or more numbers may be assigned to each single order. FIG. 3 illustrates numbers that may be associated with a single order in accordance with one embodiment. As shown, one or more of a sequence number 30, a bar code tracking number 32, and an RFID tracking number 34 may be associated with each single order. In some embodiments, the sequence number may be referred to as an order number. In embodiments using an RFID tracking number, more than one RFID tracking number may be associated with each single order. Generally, each of the sequence number, bar code tracking number, and RFID tracking number is unique during the manufacturing process and is associated with each of the other numbers for the single order.

Referring back to FIG. 2, associating at least one number with each single order [block 16] may comprise associating a sequence number with the order. Generally, a sequence number may associated with every item in that order. For example, the sequence number may be associated with a customized yearbook, customized graduation announcements, and a common cap and gown. Thus, all items included in that order may be aggregated for a single shipment, for example. In some embodiments, the sequence number may be a hexidecimal (26 digit) random number. The sequence number is associated with the single order and entered on the master list.

As shown in FIG. 2, a first portion is manufactured and a second portion is manufactured [blocks 20 and 24]. Generally as described herein the first portion may be a book block and the second portion may be a cover. The system and method is particularly suited for products such as yearbooks having common portions and customized portions. Such common portions and customized portions may be within the book block or the cover. For example, a book block may include a plurality of pages common to every yearbook as well as one or more pages customized to a specific student. It is to be appreciated that this description may alternatively be applied to other items.

As is described more fully below, first and second identifiers are associated with a number, the first identifier being associated with the first portion and the second identifier being associated with the second portion. The identifiers are associated with one of the numbers assigned to the single order. At some points in the manufacturing process, the identifier may be a bar code. At other points in the process, the identifier may be an RFID chip. It is to be appreciated that other identifiers may alternatively be used as would be known to one skilled in the art.

Production of the Book Block

As previously discussed, at least one number is associated with each single order (block 16 of FIG. 2). In some embodiments, the at least one number may be a sequence number. Thus, the sequence number may be associated with each single order and further numbers correlated to the sequence number. For example, a tracking number may be correlated to the sequence number.

The tracking number is a number that is physically placed on the book block, for example via a bar code or RFID chip. A tracking number may associated with each book block, including book block for books that will not have a customized portion. The tracking number may be the same number as the sequence number or may be a different number. In some embodiments, a first tracking number associated with the book block may be a bar code tracking number. In a specific embodiment, the bar code tracking number comprises the year, customer/job number, signature number, a 4 digit sequential number for a student, and a rev level of the signature (indicating the revision number).

In some embodiments, manufacturing a first portion of a yearbook for each single order [block 20] may comprise manufacturing a book block. Production of the book block may begin with printing of a signature at a digital press. Correlating the first identifier with the first portion of the yearbook [block 20] may thus comprise correlating a first identifier with the book block. In a specific embodiment, a bar code (comprising the bar code tracking number) may be printed on the signature. In alternative embodiments, other tracking mechanisms, such as an RFID chip, may be used and a bar code may not be printed on the signature. In some embodiments, the bar code is printed on a page of the book block. In alternative embodiments, the bar code may be printed on any portion of the book block including portions where the bar code may be removed and/or portions where the bar code may be permanently incorporated in the book. Similarly, an RFID chip may be placed at any suitable portion of the book block. For example, the RFID chip may be placed in a gutter (or deep fold) of a signature of a book block.

Producing of a book block wherein the first identifier is a bar code will now be described. It is to be appreciated that production may differ in ways appreciated by one skilled in the art when the first identifier is a tracking mechanism other than a bar code. The bar code is scanned and the associated book portion tracked through folding, gathering, sewing, and tipping. More specifically, the bar code is used for tracking the book through collation of pages into a book block. In some embodiments, the bar code (or other tracking mechanism) may be read at each production step of the book block to record the time the book travels through a machine at that step and to gather specific instructions for the book at each step where appropriate. Accordingly, if it is determined that the there is a quality issue with the book manufacturing process—for example an issue with sewing of the book block—the exact time of the issue can be determined and all book blocks (or book elements) that were processed through that machine after it is determined that the quality issue arose.

In a specific embodiment, near the final stages of production of a book block using a bar code tracking number, the system transitions from bar code tracking to RFID tracking. Generally, an RFID chip is then applied to the book block and the bar code is removed or obscured.

Figure 4:
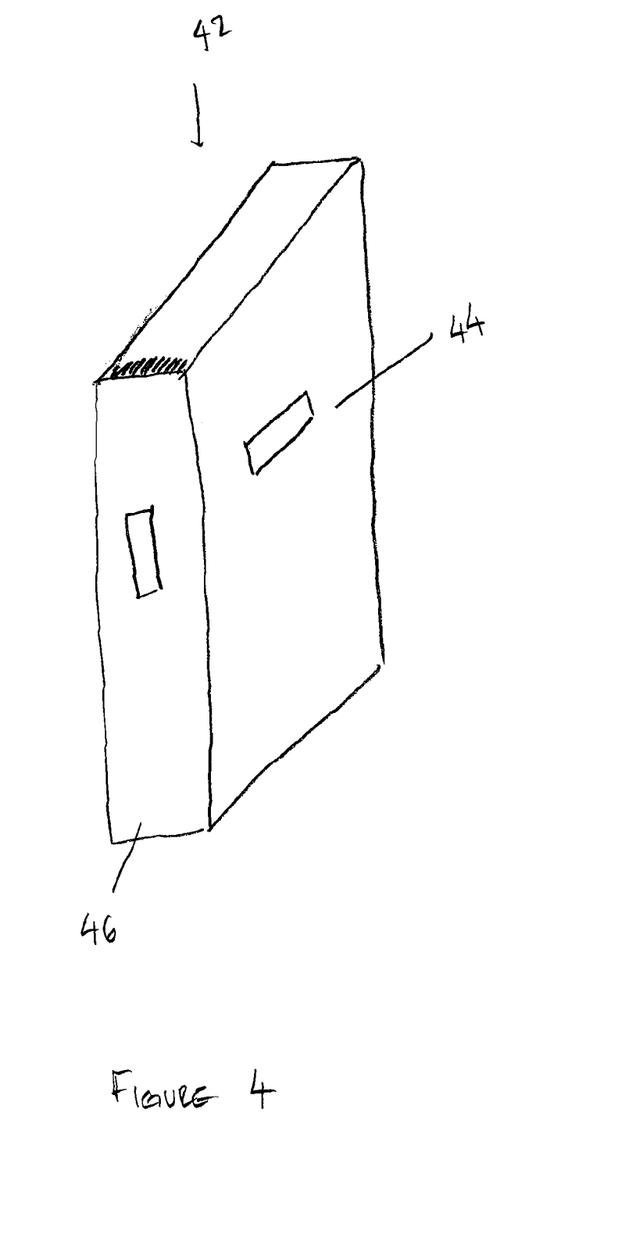
FIG. 4 illustrates possible locations for application of the RFID chip to the book block in accordance with some embodiments of the present invention.
Figure 5:
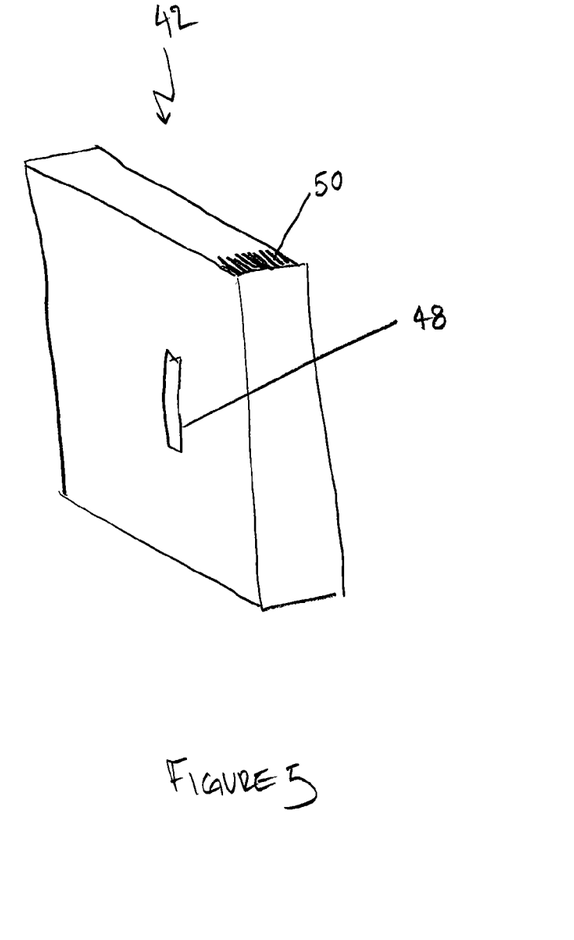
FIG. 5 illustrates possible locations for application of the RFID chip to the book block in accordance with other embodiments of the present invention.

In one embodiment of transition from bar code tracking to RFID tracking, application and removal is done after a final machine in the book block processing. For example, as the book block comes off of the gluing machine, a device may be provided for opening the book to the page having the bar code and reading the bar code (or simply reading the bar code on an outer portion of the book block if the bar code is applied thereon). Reading of the bar code causes a signal to be generated and sent to an RFID printer. The RFID printer then prints and applies an RFID tag to the book block. In some embodiments, the RFID chip is applied to the spine of the book block such that the chip is covered and cannot be seen when the cover is applied to the book. In other embodiments, the RFID chip is applied to the front of the book block or to the back of the book block. FIGS. 4 and 5 illustrate possible alternative locations for application of the RFID chip 40 to the book block 42. FIG. 4 illustrates locations on the front 44 and spine 46 of the book block 42. FIG. 5 illustrates locations on the back 48 and the gutter 50 of the book block 42. It is to be appreciated that in embodiments wherein only one RFID chip is applied to the book block, only one of these locations will be used. In other embodiments, no RFID chip may be applied directly to the book block and an RFID chip may be associated with the book block when the cover may be applied to the book block. In some embodiments, a first RFID chip is applied to the book block and a second RFID chip is applied to the cover, described more fully below.

The RFID chip has an associated tracking number. The RFID tracking number may be the same as the bar code tracking number, may be the sequence number, or may be a different number that is associated with the sequence number. In one embodiment, the RFID printer applies the RFID tag to the front of the book. After application of the RFID chip, the bar code may be removed from the book. This may be done by trimming the portion of the page including the bar code. Alternatively, the bar code may be otherwise obscured.

In some embodiments, a label may be provided on one side of the RFID chip. The label may include information associated with the single order for the book including, for example, the ordering student's name, the bar code, the sequential number associated with the student, and school information. In some embodiments, some of the information on the label may be printed sufficiently darkly that that information may be seen through covering of the RFID chip. For example, where an endsheet couples the book block to the cover and the endsheet covers the RFID chip, the student's name may be printed sufficiently darkly that the student's name is visible through the endsheet.

At various points during the manufacturing process, the identifier (bar code, RFID chip, or other tracking mechanism) may be used to conduct as part of a pass/fail test. For the test, a reader reads the identifier to determine the tracking number associated with the identifier. In embodiments using an RFID chip, the RFID chip is activated such that it may be read to determine the RFID tracking number. The determined tracking number is then compared to the master list to ensure that the book component (pages, book block, cover, etc.) is the correct book component. If the book element does not pass the pass/fail test, processing of that book is halted. Thus, for example, the RFID chip and/or the bar code may be read before the bar code is removed from the book block to ensure that the correct RFID chip was associated with the book block.

Production of the Cover

In some embodiments, manufacturing a second portion of the yearbook for the single order [block 24] may comprise manufacturing a cover for a yearbook and correlating the second identifier with the second portion of the yearbook [block 24] may comprise printing a bar code identifier and/or placing an RFID chip identifier on the cover. Covers may be customized, thus specific to one student, or may be common. Generally, covers comprise a printed portion that is wrapped around a facing board. When the printed portion is printed, a bar code identifier may be printed on a side that is facing the board as assembled. For example, the bar code identifier may be printed on the printed portion such that the bar code is on the lip that is folded in on the facing board as assembled. The bar code number on the bar code printed on the cover may be the same as the bar code number on the bar code printed on the book block, if used. Alternatively, a different bar code number associated with the sequence number may be used. In some embodiments, an RFID chip identifier may additionally or alternatively be applied to the cover, such as to the inside spine of the cover, to the inside front of the cover, to the inside back of the cover, or to other suitable location on the cover. The RFID chip may be embedded between the cover board and the printed cover material or between the cover board and the endsheet. Such RFID chip has an associated RFID tracking number. The associated RFID tracking number may be the same as the tracking number for the RFID chip of the book block or may be different. Each of the bar code tracking number and RFID tracking number of the cover is associated with the sequence number or otherwise associated with the single order.

The cover may undergo further operations such as embossing, graining, etc. As the cover proceeds through different stations, the identifier (bar code or RFID chip) is read and matched to the sequence number to determine the appropriate operation based on the master list. The equipment for each process thus receives instructions based on the master list.

Association of the Cover with the Book Block

Referring back to FIG. 2, the first portion and the second portion are combined [block 26]. Thus, in one embodiment, after the cover has been produced, the cover is applied to the finished book block. Application of the cover to the book block may be referred to as casing. At casing, a pass/fail test is conducted. A reader verifies that the book blocks are in sequence. In some embodiments, the sequence may reflect the sequence of the master list. If a book block is out of order, the book block feeder to the casing system is shut down but the remainder of the system may continue. Thus, book blocks and covers already fed to the casing system may be processed. Likewise, a reader verifies that the covers are in sequence. If a cover is out of sequence, the hopper to the casing system is shut down but the remainder of the system may continue. Thus, book blocks and covers already fed to the casing system may be processed. If the book block feeder is shut off, the hopper is likewise shut off. If the hopper is shut off, the book block feeder is likewise shut off.

After sequence has been verified, the book block feeder feeds book blocks to the casing system and the hopper feeds covers to the casing system. Shortly before the cover is glued to the book block, a further set of readers reads the identifiers of the book block and the cover. These readers again verify sequence based on comparison to the master list. If the sequence read by each reader does not match, the casing operation is shut off. If the sequence read by each of the readers does match, the casing operation proceeds.

When the book block is fixed to the cover, the identifying mechanism on the book block is automatically associated with the cover. For example, if an RFID chip has been applied to the front of the book block, the RFID chip is automatically associated with the book block when the book block is fixed to the cover. In some embodiments wherein an RFID chip is applied to the book block and an RFID chip is applied to the cover, the RFID chips may be applied such that they substantially align and stack when the book block is placed in the cover, thereby accentuating the placement of the RFID chips.

Post Processing

After casing, the book proceeds to activation station where the RFID chips (if RFID chip identifiers were used, alternatively each of the other tracking mechanisms are read) for both the book block and the cover are activated. A reader then verifies that both chips match and that the chips match the book. If matching is confirmed, a label is printed and applied to the book. The label may be printed with identifying information such as the name of the student, the sequence number, etc. In some embodiments, after casing operations may be performed and these may be indicated on the label.

If further post processing, such as laser die cuts, tip ins, embossing, extra content, etc., the book may be directed to the appropriate machine for such processing. That machine reads the RFID chips associated with the book to compare with the master list and determine instructions.

In some embodiments, a single order may include further components to be added to the book. For example, a student may order the book, graduation announcements, CDs, DVDs, or other. These components may similarly have tracking devices correlated to them where the components are customized. Alternatively, if the component is a common component, such as a graduation cap, no tracking device may be associated with it. Each component may be identified with a sequence number and all components having that sequence number aggregated. In some embodiments, a pick pack station may be implemented such that a reader scans the chip and outputs what items should be added to the book.

Storage and Shipping

For shipping, books are packaged in a box. The books may be packaged in sequence or other. The entire box can be scanned to read the RFID chips of the books in the box. These books may then be checked against the master list for an aggregate order. The chips are thus used to verify completion of an order. For at least this reason, it is useful to associate an RFID chip with common books as well as customized books.

If the books are not shipped immediately, they may be warehoused. Such warehousing may be individually or in boxes. The RFID chip of each book may be used to catalogue placement of the book in a warehouse. Thus, when it is time to ship the book, the chip may be read or entered to locate the book or box and process to shipping.

A reader may be provided at the truck for receiving skids of books with the boxes scanned and a bill of laden and/or other shipping documents printed inventorying regarding what is shipped from the warehouse. An advance shipping notice may be sent to the school based on the reading of the truck to provide advance notice of the likely delivery date. In this way, schools may be notified of exact time and place of shipment of books.

Although the present invention has been described with reference to preferred embodiments, persons skilled in the art will recognize that changes may be made in form and detail without departing from the spirit and scope of the invention.

What is claimed is:

1. A method for creating a customized product comprising:
receiving an aggregate order for yearbooks;
creating a master list associated with the aggregate order and including single orders, associating at least one number with each single order;
manufacturing in a process a book block of a yearbook for each single order, where a bar code is attached to the book block to identify the book block and associate the book block with the at least one number, wherein the bar code is associated with a first processing portion of the manufacturing process of the book block and a RFID is then attached to the book block to identify the book block and associate the book block with the at least one number, wherein the RFID is associated with a second processing portion of the manufacturing process of the book block;
manufacturing in a process a cover of the yearbook for the single order, where a bar code is attached to the cover to identify the cover and associate the cover with the at least one number, wherein the bar code is associated with a first processing portion of the manufacturing process of the cover and a RFID is then attached to the cover to identify the cover and associate the cover with the at least one number, wherein the RFID is associated a second processing portion of the manufacturing process of the cover; and
combining the manufactured book block and cover.

2. The method of claim 1, wherein the at least one number comprises a sequence number and may be used to ensure the book block and/or the cover are in order in the manufacturing process.

3. The method of claim 1, wherein the RFID includes a RFID tracking number associated with the at least one number.

4. A method of creating a customized product including a first portion and a second portion, the method comprising:
- processing an order for the customized product;
- associating an order number with the order;
- associating a first and second tracking number with the order number;
- manufacturing in a process a book block of the customized product, wherein a bar code is attached to the book block to identify the book block and associate the book block with the first tracking number, wherein the bar code is associated with a first processing portion of the manufacturing process of the book block and a RFID is then attached to the book block to identify the book block and associate the book block with the first tracking number, wherein the RFID is associated with a second processing portion of the manufacturing process of the book block;
- manufacturing in a process a cover of the customized product, wherein a bar code is attached to the cover to identify the cover and associate the cover with the second tracking number, wherein the bar code is associated with a first processing portion of the manufacturing process of the cover and a RFID is then attached to the cover to identify the cover and associate the cover with the second tracking number, wherein the RFID is associated with a second processing portion of the manufacturing process of the cover; and
- combining the manufactured book block and cover.

5. The method of claim 4, wherein the second processing portion of the manufacturing process includes combining the cover and the book block.

6. The method of claim 4, wherein manufacturing the book block and manufacturing the cover includes tracking progress of the book block and the cover by reading the tracking numbers using machine readers.

7. The method of claim 6, wherein manufacturing may be halted when reading by the machine readers establishes an error.

8. The method of claim 7, wherein the error is a sequence error.

9. The method of claim 4, wherein the first tracking number and the second tracking number are the same.

\* \* \* \* \*